(12) United States Patent
Stiesdal et al.

(10) Patent No.: US 8,202,048 B2
(45) Date of Patent: Jun. 19, 2012

(54) METHOD OF OPERATING A WIND TURBINE AND WIND TURBINE

(75) Inventors: Henrik Stiesdal, Odense C (DK);
Martin Winther-Jensen, Haslev (DK)

(73) Assignee: Siemens Aktiengesellschaft, München (DE)

( * ) Notice: Subject to any disclaimer, the term of this patent is extended or adjusted under 35 U.S.C. 154(b) by 1082 days.

(21) Appl. No.: 12/150,951

(22) Filed: May 1, 2008

(65) Prior Publication Data
US 2009/0060740 A1 Mar. 5, 2009

(30) Foreign Application Priority Data
May 3, 2007 (EP) .................................... 07008976

(51) Int. Cl.
*F03D 7/04* (2006.01)

(52) U.S. Cl. .................. 416/1; 416/35; 416/37; 416/41; 416/61; 416/147

(58) Field of Classification Search ................. 416/1, 35, 416/37, 40, 41, 61, 147
See application file for complete search history.

(56) References Cited

U.S. PATENT DOCUMENTS

| | | | |
|---|---|---|---|
| 5,289,041 A * | 2/1994 | Holley | 290/44 |
| 2003/0127862 A1 | 7/2003 | Weitkamp | |
| 2003/0160457 A1 | 8/2003 | Ragwitz et al. | |
| 2005/0253396 A1* | 11/2005 | Mikhail et al. | 290/44 |
| 2006/0033338 A1* | 2/2006 | Wilson | 290/44 |
| 2007/0018457 A1 | 1/2007 | Gonzalez | |
| 2007/0075546 A1* | 4/2007 | Avagliano et al. | 290/44 |

FOREIGN PATENT DOCUMENTS
EP 0 847 496 B1 6/1998

* cited by examiner

Primary Examiner — Igor Kershteyn

(57) ABSTRACT

The invention concerns a method of operating a wind turbine, wherein for a reduction of a wind load impacting on the wind turbine the rotational speed of the rotor and/or the electrical power output of the wind turbine are reduced depending on a deviation of the wind speed from the average wind speed. Moreover the invention concerns a wind turbine comprising a calculating unit adjusted for executing the inventive method.

14 Claims, 2 Drawing Sheets

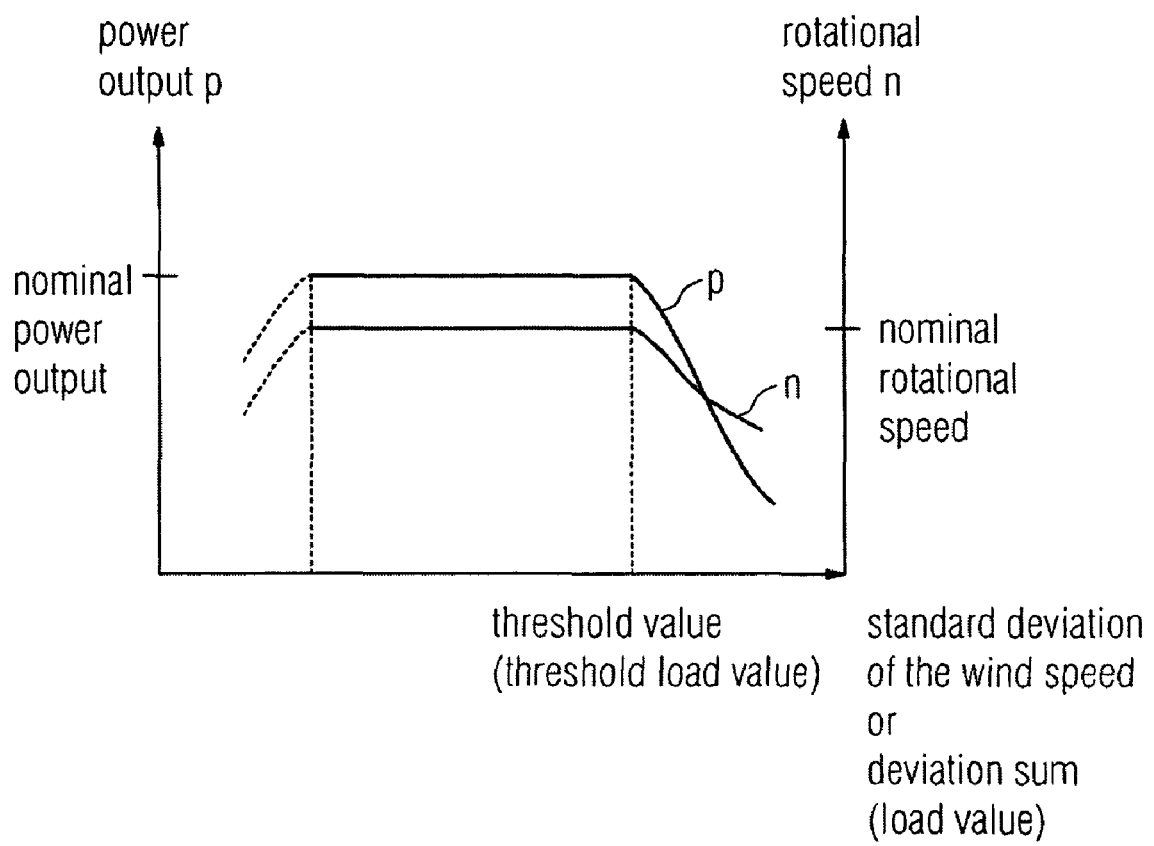

METHOD OF OPERATING A WIND TURBINE AND WIND TURBINE

CROSS REFERENCE TO RELATED APPLICATIONS

This application claims the benefits of European application No. 07008976.8 filed May 3, 2007, both of the applications are incorporated by reference herein in their entirety.

FIELD OF INVENTION

The invention relates to a method of operating a wind turbine in particular to a method of operating a wind turbine in situations with high wind speeds and high turbulence levels. The invention relates also to a wind turbine.

BACKGROUND OF THE INVENTION

In operation of wind turbines sometimes situations arise with high wind speeds and high turbulence levels causing a high load of the wind turbine in particular of the rotor blades of the wind turbine. For avoidance of any damage of the wind turbine particularly of the rotor blades of the wind turbine under these terms the wind load on the wind turbine must be reduced. An existing process by which the wind load on wind turbine is reduced in high wind conditions is simply shutting down the wind turbine when the wind speed exceeds one or more threshold values. Thus a wind turbine is e.g. shut down, when the wind speed exceeds the value of about 25 m/s for about 10 minutes, when the wind speed exceeds the value of about 28 m/s for about 30 seconds or when the wind speed exceeds the value of about 32 m/s for about 1 second.

However the wind load of a wind turbine is in general not only a function of the wind speed but also of the turbulence intensity as a descriptor for turbulences. Roughly speaking the wind speed and the turbulence defines the static wind load and for a given wind speed the turbulence defines the fatigue wind load. The existing process by which the wind turbine is shut down if a defined criterion is met partially accounts for the turbulence, wherein the wind turbine is shut down if gusts reach a wind speed of about 32 m/s for about 1 second. However assessing turbulence exclusively on the basis of a single gust is as a rule a too large simplification.

Thus the existing process of the on/off regulation of wind turbines may cause during gale conditions more or less all wind turbines in a whole region to shut down due to high wind speed to reduce the wind load on these wind turbines, even though many wind turbines could have been in operation and could have maintained power output to the grid because in particular the turbulence load may be well within safe limits.

EP 0 847 496 B1 discloses a method of operating a wind turbine, in which the power of the wind turbine as well as the operating speed of the rotor is continuously reduced when a wind velocity is reached which is in danger of overloading the wind turbine. The power of the wind turbine and the operating speed are reduced in dependence on the rise in the wind velocity or incident-stream velocity. With this method a region-wide shut down of wind turbines can be avoided because the wind turbines affected by high wind are only partially reduced in power output. However, this method does not take account of the turbulences and hence not of an important parameter determining wind turbine load.

US 2007/0018457 A1 discloses a wind turbine and a method of operating a wind turbine, wherein the rotor speed and/or the generator power are reduced in response to variables exceeding predetermined values. The variables are e.g. the wind direction relative to horizontal direction of main shaft of turbine, the turbulence of the wind or any other variable sensed by one or more sensors mounted on components of the turbine.

US 2003/0127862 A1 discloses a control system for a wind power plant comprising sensor means for the detection of measurement values to be used for direct or indirect quantification of the current loading and/or stress of the turbine occurring in dependence on the local and meteorological conditions. Downstream of said detection means, an electronic signal processing system is provided, operative to the effect that the power reduction required in the optimized condition of the wind power plant will be restricted to obtain optimum economical efficiency under the current operating conditions, both in cases of winds in the range of the nominal wind velocity and in cases of high wind velocities.

US 2003/0160457 A1 discloses a method for processing and/or predicting flow data of a flowing medium, in which from values of at least one flow parameter which are successively measured on a continuous basis at one or various locations in the medium, said flow parameter being characteristic for the speed of the medium, a time series is formed and updated which is subjected to a nonlinear deterministic prediction procedure on the basis of a locally constant phase space model for generating prediction values for the respective subsequent flow parameters. A predetermined control signal is generated if the prediction values are characteristic for an impending change in the flow speed. In case of a wind power generator inter alia an anemometer continuously measures the wind speed. The wind speed or quantities derived thereof, like the deviation between a currently measured value of the wind speed and the average over time, are subject to processing for preparing a characteristic forecast value, which is compared to a predetermined reference criterion. If during comparison, a predicted wind gust is confirmed, the wind power generator is operated in the decelerated state.

SUMMARY OF INVENTION

It is therefore an object of the present invention to provide a method and a wind turbine as initially mentioned in such a way, that an unnecessary shut down of a wind turbine particularly in high wind conditions can be preferably avoided.

This object is inventively achieved by a method of operating a wind turbine, wherein for a reduction of a wind load impacting on the wind turbine the rotational speed of the rotor of the wind turbine and/or the electrical power output of the wind turbine to the grid are reduced depending on at least a deviation of the wind speed from the average wind speed, wherein the rotational speed of the rotor and/or the electrical power output of the wind turbine are reduced as a function of the deviation of the wind speed from the average wind speed, when the deviation of the wind speed from the average wind speed attains or exceeds a threshold value.

According to the inventive method not only the wind speed but the deviation of the wind speed from the average wind speed, e.g. as average over a given time period or exponentially reduced with time, is applied preferably as a value for the decision whether the rotational speed of the rotor and/or the electrical power output of the wind turbine shall be reduced for reducing the wind load or whether the wind turbine shall be shut down. The inventors have thereby recognized that the deviation of the wind speed from the average wind speed is a comparative precise descriptor of the wind load that will arise as a result of the wind conditions. Thus the deviation of the wind speed from the average wind speed is a comparative good decision criterion. Moreover by using the deviation of the wind speed from the average wind speed as a decision criterion it is avoided that some single gusts cause a reduction of the rotational speed of the rotor and/or the electrical power output to the grid or even an unnecessary shut down of the wind turbine. According to the inventive method it is compared to the method only working with the wind velocity or incident-stream velocity additionally avoided that the rotational speed of the rotor and/or the electrical power output to the grid are earlier reduced than necessary. Because the inventive method works with the deviation of the wind speed from the average wind speed the wind turbine can be longer operated in particular under gale conditions with the nominal rotational speed of the rotor and/or the nominal electrical power output until a reduction of the rotational speed of the rotor and/or the electrical power output occurs. Thereby the value of the deviation of the wind speed from the average wind speed can be determined continuously or discrete.

The mentioned threshold value for the start of the reduction is as a rule an eligible threshold value. Preferably the threshold value is respectively determined for a specific type of wind turbine. An adequate threshold value can be determined e.g. by computer simulation or field measurement.

The functional relation of the deviation of the wind speed from the average wind speed and the reduction of the rotational speed of the rotor and/or the electrical power output to the grid can be determined or defined by the operator of the wind turbine in adaptation to the respective type of a wind turbine. Preferably the rotational speed of the rotor and/or the electrical power output of the wind turbine are reduced from the nominal value of the rotational speed of the rotor and/or the nominal value of the electrical power output as a function of the deviation of the wind speed from the average wind speed when the deviation of the wind speed from the average wind speed attains or exceeds a certain threshold value.

Preferably the deviation of the wind speed from the average wind speed is thereby according to a variant of the invention the well defined standard deviation of the wind speed.

According to another variant of the invention the deviation of the wind speed from the average wind speed is iterative determined in consideration of the average wind speed and the instantaneous wind speed. Preferably the deviation of the wind speed from the average wind speed is determined as a deviation sum according to the following equations:

$$D_n = C \cdot \text{num}(V_{inst,n} - V_{av,n}) + (1-C) \cdot D_{n-1} \quad (1)$$

$$V_{av,n} = C \cdot V_{inst,n} + (1-C) \cdot V_{av,n-1} \quad (2)$$

with $D_n$ deviation sum at the n'th calculation step,
$D_{n-1}$ deviation sum at the previous calculation step,
Vav,n average wind speed at the n'th calculation step,
Vav,n−1 average wind speed at the previous calculation step,
Vinst,n instantaneous wind speed at the n'th calculation step,
C constant being a number between 0 and 1 and
num numerical value.

Thus the deviation of the wind speed from the average wind speed can be continuously or discrete determined e.g. stringently according to the mathematical definition of the standard deviation or as an updated deviation sum. Thereby the constant C can be an exponential averaging constant preferably adapted to the respective type of wind turbine. As mentioned above the rotational speed of the rotor and/or the electrical power output are reduced, when the value of the standard deviation or the deviation sum attains or exceeds a defined threshold value.

In a further development of the invention the rotational speed of the rotor and/or the electrical power output of the wind turbine are reduced in consideration of at least one further meteorological parameter, which is e.g. the deviation of the wind direction from the average wind direction. The deviation of the wind direction from the average wind direction can be determined as the standard deviation of the wind direction According to an embodiment of the invention at least one load value or damage factor is determined. Particularly the load value is determined as a function of relevant meteorological parameters comprising as a minimum the deviation of the wind speed from the average wind speed in particular the standard deviation of the wind speed and optionally the average value of the wind speed and/or the deviation of the wind direction from the average wind direction in particular the standard deviation of the wind direction and/or where applicable other relevant meteorological parameters.

The relation of the load value and at least one meteorological parameter can be preferably determined in advance as a result of aero-elastic computer simulations and/or field measurements of loading.

The relation of the load value and at least one meteorological parameter can also be determined in an adjusting process based on at least one measurement value acquired by at least one transducer. The adjusting process can be a kind of learning process for a self-adjustment or self-determination of the relation using current and/or stored loading information based on measurement values acquired by the at least one transducer. The transducer can be e.g. an accelerometer or a strain gauge. As a rule a plurality of such transducers are attached e.g. to the rotor blades of the wind turbine to acquire the relevant measurement values.

According to an embodiment of the invention the rotational speed of the rotor and/or the electrical power output of the wind turbine are reduced, when the load value attains or exceeds a load threshold value. Preferably the rotational speed of the rotor and/or the electrical output power of the wind turbine are reduced from the nominal value of the rotational speed of the rotor and/or the nominal value of the electrical power output of the wind turbine as a function of the load value derived from one or more of the mentioned meteorological parameters when the load value attains or exceeds a certain threshold load value.

The object of the invention is also achieved by a wind turbine comprising a calculating unit e.g. a turbine controller adjusted for executing one of the described methods. The turbine controller or a storage of the turbine controller comprises a respective computer program or respective computer program modules for executing one of the described methods.

BRIEF DESCRIPTION OF THE DRAWINGS

The invention will in the following be explained in more detail with reference to the schematic drawings, where
FIG. 2 shows the wind turbine of FIG. 1 in a side view and
FIG. 3 shows schematically a characteristic line of the rotational speed of the rotor and a characteristic line of the electrical power output of a wind turbine to the grid in each case as a function of the deviation of the wind speed from the average wind speed or of the load value.

DETAILED DESCRIPTION OF INVENTION

Figure 1:
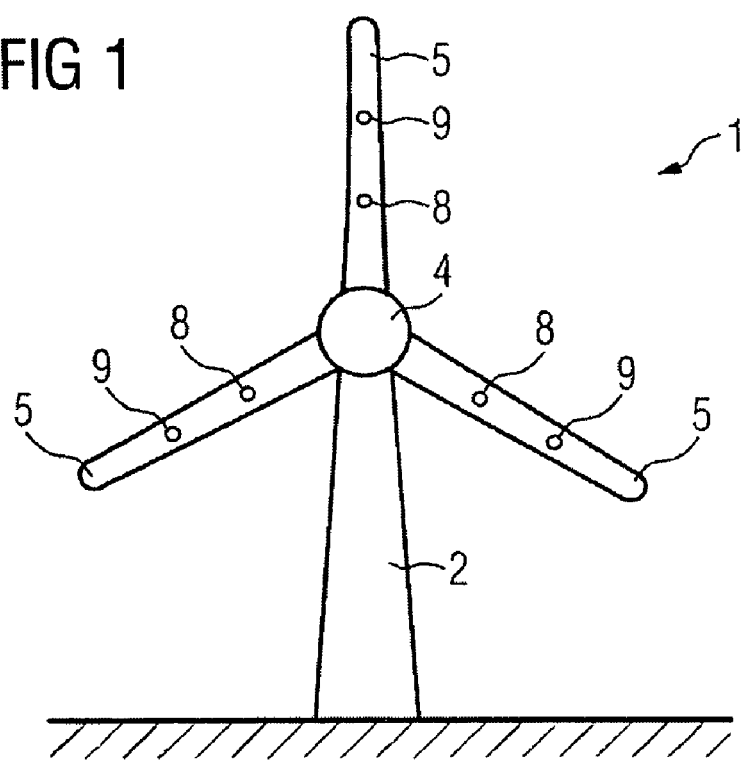
FIG. 1 shows schematically a wind turbine in a front view.
Figure 2:
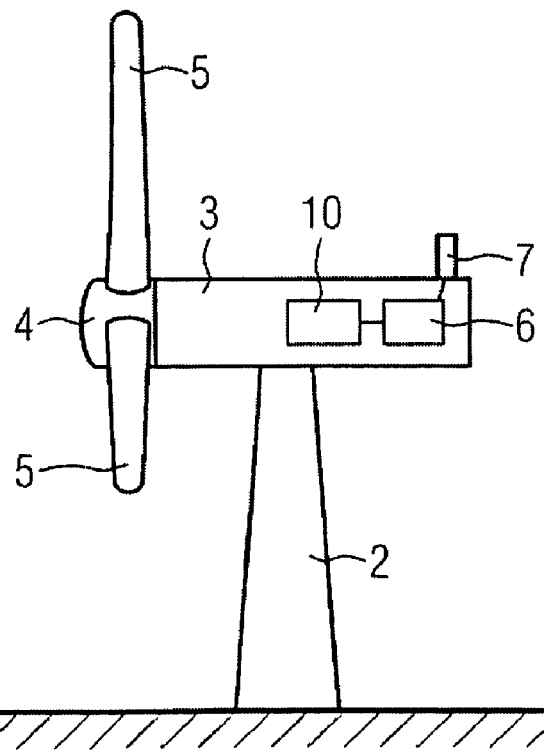

FIG. 1 and FIG. 2 show in different views schematically a wind turbine 1 according to the present invention. The wind turbine 1 comprises a tower 2, a nacelle 3 and a rotor including a hub 4 with three pitch controlled rotor blades 5. An electrical generator 10 and a calculating unit in form of a wind turbine controller 6 are arranged inside the nacelle 3. Moreover the wind turbine 1 comprises a measuring device 7 for the determination of the instantaneous wind speed and the wind direction. The turbine controller 6 and the measuring device 7 are electrically connected with each other. Thus the wind turbine controller 6 receives continuously the instantaneous wind speed and the wind direction form the measuring device 7. The wind turbine controller 6 is also electrically connected to the other equipment of the wind turbine 1 e.g. the generator 10, the not shown pitch controller of the rotor blades 5, the not shown rotor brake, the not shown yaw system et cetera.

A storage of the wind turbine controller 6 or the wind turbine controller 6 comprises a program or one or several program modules with a control method or a control algorithm of operation the wind turbine 1 in particular in situations with high wind speed and high turbulence levels. The wind turbine controller 6 is inter alia operated with this control program or these program modules or this control program or these program modules are loaded to the wind turbine controller 6 under high wind conditions.

Under conditions with a high wind speed and a high turbulence intensity the wind load to the wind turbine 1 and in particular to the rotor blades 5 of the wind turbine 1 increase strongly. It is therefore essential to reduce the wind load to the wind turbine 1 but to avoid an unnecessary or a too early shut down of the wind turbine 1. Conventional equipped or adjusted wind turbines are namely often shut down as a result of some single gusts under an already high mean wind speed, even though many of them could have maintained power supply to the grid because the total turbulence loading may be well in safe limits.

According to the inventive method executed by the wind turbine controller 6 the operation, the regulation and/or the control of the wind turbine 1 under high wind conditions is not only based on a mean or instantaneous wind speed measured by the measuring device 7 but inventively on the deviation of the wind speed from the average wind speed. Thus the wind speed is measured by the measuring device 7 and the deviation of the wind speed form the average wind speed is calculated by the turbine controller 6. Preferably the programmed turbine controller 6 calculates the mathematically well defined standard deviation of the wind speed. But the wind turbine controller 6 can also calculate in an iterative way a deviation sum according to the following equations:

$$D_n = C \cdot \text{num}(V_{inst,n} - V_{av,n}) + (1-C) \cdot D_{n-1} \quad (1)$$

$$V_{av,n} = C \cdot V_{inst,n} + (1-C) \cdot V_{av,n-1} \quad (2)$$

with $D_n$ deviation sum at the n'th calculation step,
$D_{n-1}$ deviation sum at the previous calculation step,
Vav,n average wind speed at the n'th calculation step,
Vav,n−1 average wind speed at the previous calculation step,
Vinst,n instantaneous wind speed at the n'th calculation step,
C constant being a number between 0 and 1 and
num numerical value.

When in case of the present embodiment of the invention the standard deviation of the wind speed or the deviation sum $D_n$ attains or exceeds an eligible threshold value of the deviation the maximum rotational speed of the rotor and/or the maximum electrical power output to grid of the wind turbine 1 are reduced from the nominal values as a function of the standard deviation of the wind speed or of the deviation sum $D_n$. As a result of this reduction of the rotational speed of the rotor and/or of the electrical power output the wind load to the wind turbine 1 is reduced but the wind turbine 1 is still in operation. By using the standard deviation of the wind speed or the deviation sum a too early reduction of the rotational speed of the rotor and/or the electrical power output from the nominal values, a too early shut down and/or an unnecessary shut down of the wind turbine 1 can be avoided. The determination or definition of an adequate threshold value can be a result of theoretical considerations e.g. applying computer simulations or of empirical field measurements applying transducer e.g. accelerometers 8 and/or strain gauges 9 e.g. attached to the rotor blades 5 during an adjusting process and electrically connected to the wind turbine controller 6. Based on the transducer values the wind load of the rotor blades 5 e.g. in form of the acceleration or the bending moment of the rotor blades 5 can be determined or considered by the wind turbine controller 6 under different wind conditions and can be compared with the simultaneous calculated standard deviation of the wind speed or the deviation sum. Based on this comparison an adequate threshold value can be determined, defined or chosen.

Also the functional relation of the deviation of the wind speed from the average wind speed and the reduction of the rotational speed of the rotor and/or the reduction of the electrical power output to the grid can be the result of theoretical considerations and/or empirical measurements in consideration of the relation of the deviation of the wind speed from the average wind speed and the wind load on the wind turbine.

FIG. 3 shows exemplarily the characteristic line of the rotational speed of the rotor and the characteristic line of the electrical power output of the wind turbine 1 in each case as function of the standard deviation of the wind speed or alternatively as a function of the deviation sum respectively in particular when the deviation of the wind speed from the average wind speed attains or exceeds the defined threshold value. In case of the present embodiment the rotational speed of the rotor and the electrical power output are reduced continuously. But the reduction can also be stepwise.

According to a further development of the invention at least one load value or damage factor is determined e.g. as a function of relevant meteorological parameters that include as a minimum the deviation of the wind speed from the average wind speed in particular the standard deviation of the wind speed and can also include the mean value of the wind speed, the deviation of the wind direction from the average wind direction in particular the standard deviation of the wind direction and if applicable further relevant meteorological parameters.

When in case of the present embodiment of the invention the load value attains or exceeds an eligible threshold load value the maximum rotational speed of the rotor and/or the maximum electrical power output to grid of the wind turbine 1 are reduced from the nominal values as a function of the load value. The reduction of the rotational speed of the rotor and/or the electrical power output in dependence of the load value can be continuous as shown in FIG. 3 or stepwise. In a comparable way as mentioned before the rotational speed of the rotor and/or the electrical power output to the grid of the wind turbine 1 and thus the wind load to the wind turbine 1 are reduced but the wind turbine 1 is still in operation. Consequently a too early reduction of the rotational speed of the rotor and/or the electrical power output from the nominal values, a too early shut down and/or an unnecessary shut down of the wind turbine 1 can be avoided.

The relation of the load value and at least one meteorological parameter may be determined in advance as a result of aero-elastic simulations or field measurements of loading. Based on measurement values acquired by transducers like the accelerometers 8 and/or the strain gauges 9 the wind load of the rotor blades 5 e.g. in form of the acceleration or the bending moment of the rotor blades 5 can be determined or considered by the wind turbine controller 6 under different wind conditions and can be compared with the simultaneous determined meteorological parameters derived from the measurement values of the measuring device 7. Thus different load values can be determined in relation to at least one meteorological parameter or the load value can be determined as a function of at least one meteorological parameter. The relation may also be the result of a self-adjusting or learning process by the wind turbine controller 6. In practice the wind turbine controller 6 can comprise e.g. a look up table wherein a certain load value belongs to a certain meteorological parameter or to a certain tuple or combination of different meteorological parameters like the standard deviation of the wind speed, the mean value of the wind speed, the standard deviation of the wind direction and optionally other meteorological parameters describing the variability of the wind.

The determination or definition of an adequate threshold load value can again be a result of theoretical considerations e.g. applying computer simulations or of empirical field measurements.

Also the functional relation between the load value and the reduction of the rotational speed of the rotor and/or the reduction of the electrical power output to the grid can be the result of theoretical considerations and/or empirical field measurements.

The reduction of the rotational speed of the rotor and/or the reduction of the electrical power output to the grid of the wind turbine 1 can be achieved by a change of the blade pitch angle of the rotor blades 5. The pitch control is effected by the wind turbine controller 6 or by a pitch controller in communication with the wind turbine controller 6.

As a rule the transducers in form of the accelerometers 8 and the strain gauges 9 are only attached to the rotor blades 5 during an adjustment or learning process for gathering reference load values. During the normal operation of a wind turbine no such transducer are attached to the rotor blades.

The invention has the advantage that the reduction of the rotational speed of the rotor of a wind turbine and/or the electrical power output of a wind turbine to the grid under high wind conditions is based not only on the wind speed but on the deviation of the wind speed from the average wind speed and optionally on further meteorological parameters that directly affect the wind load. The invention avoids that in a region stand alone wind turbines or wind turbines of a wind farm are shut down at the same moment. This will increase the limits for maximum penetration of wind power to the grid and will reduce the demand for backup power on the grid. The total energy or power output of the wind turbine to the grid will be increased because there are less situations of total shut down at high wind speeds.

The invention claimed is:

1. A method of operating a wind turbine having a rotor, comprising:
   determining a wind speed;
   determining an average wind speed;
   determining a deviation of the wind speed from the average wind speed;
   comparing the deviation of the wind speed with a threshold value; and
   when the deviation of the wind speed from the average wind speed attains or exceeds a threshold value reducing
      a rotor rotational speed, or
      an electrical power output of the wind turbine or
      both the rotor rotational speed and the electrical power output of the wind turbine as a function of the deviation of the wind speed from the average wind speed.

2. The method according to claim 1, wherein the deviation of the wind speed from the average wind speed is determined as a standard deviation.

3. The method according to claim 1, wherein the deviation of the wind speed from the average wind speed is iterative determined in consideration of the average wind speed and the instantaneous wind speed.

4. The method according to claim 1, wherein the deviation of the wind speed from the average wind speed is determined according to the following equations:

$$D_n = C \cdot \text{num}(V_{inst,n} - V_{av,n}) + (1-C) \cdot D_{n-1} \quad (1)$$

$$V_{av,n} = C \cdot V_{inst,n} + (1-C) \cdot V_{av,n-1} \quad (2)$$

with
Dn deviation sum at the n'th calculation step,
Dn−1 deviation sum at the previous calculation step,
Vav,n average wind speed at the n'th calculation step,
Vav,n−1 average wind speed at the previous calculation step,
Vinst,n instantaneous wind speed at the n'th calculation step,
C constant being a number between 0 and 1 and
num numerical value.

5. The method according to claim 1, wherein the rotational speed of the rotor and/or the electrical power output are reduced in consideration of a further meteorological parameter.

6. The method according to claim 5, wherein the further meteorological parameter is the deviation of the wind direction from the average wind direction.

7. The method according to claim 6, wherein the deviation of the wind direction from the average wind direction is determined as a standard deviation.

8. The method according to claim 5, further comprising determining a load value.

9. The method according to claim 8, wherein the relation of the load value and the meteorological parameter is determined by simulation and/or by field measurement of loading.

10. The method according to claim 9, wherein the relation of the load value and the meteorological parameter is determined in an adjusting process based on a measurement value acquired by a transducer.

11. The method according to claim 10, wherein the transducer is an accelerometer or a strain gauge.

12. The method according to claim 11, wherein the rotational speed of the rotor and/or the electrical power output of the wind turbine are reduced, when the load value attains or exceeds a threshold load value.

13. The method according to claim 12, wherein the rotational speed of the rotor and/or the electrical power output of the wind turbine are reduced as a function of the load value.

14. A wind turbine, comprising:
   a tower;
   a nacelle arranged upon the tower, wherein the tower supports the nacelle;
   a rotor rotatably arranged within the nacelle, wherein the rotor has a hub and a plurality of pitch controlled rotor blades;
   an electric generator connected to and driven by the rotor;

a measuring device that measures a wind speed; and
a calculating unit that:
- determines an average wind speed;
- determines a deviation of the wind speed from the average wind speed;
- compares the deviation of the wind speed with a threshold value; and
- when the deviation of the wind speed from the average wind speed attains or exceeds a threshold value, reduces
  - a rotor rotational speed, or
  - an electrical power output of the wind turbine or
  - both the rotor rotational speed and the electrical power output of the wind turbine as a function of the deviation of the wind speed from the average wind speed.

* * * * *